May 19, 1970 T. E. MYERS 3,513,393
VOLTAGE TESTER EMPLOYING AN OSCILLATOR POWERED
BY THE TEST VOLTAGE
Filed March 26, 1968
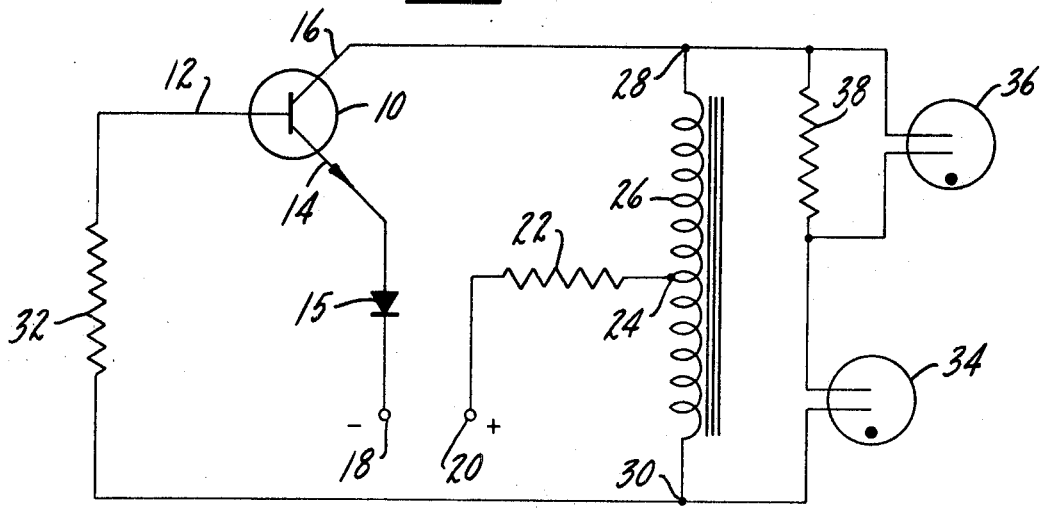
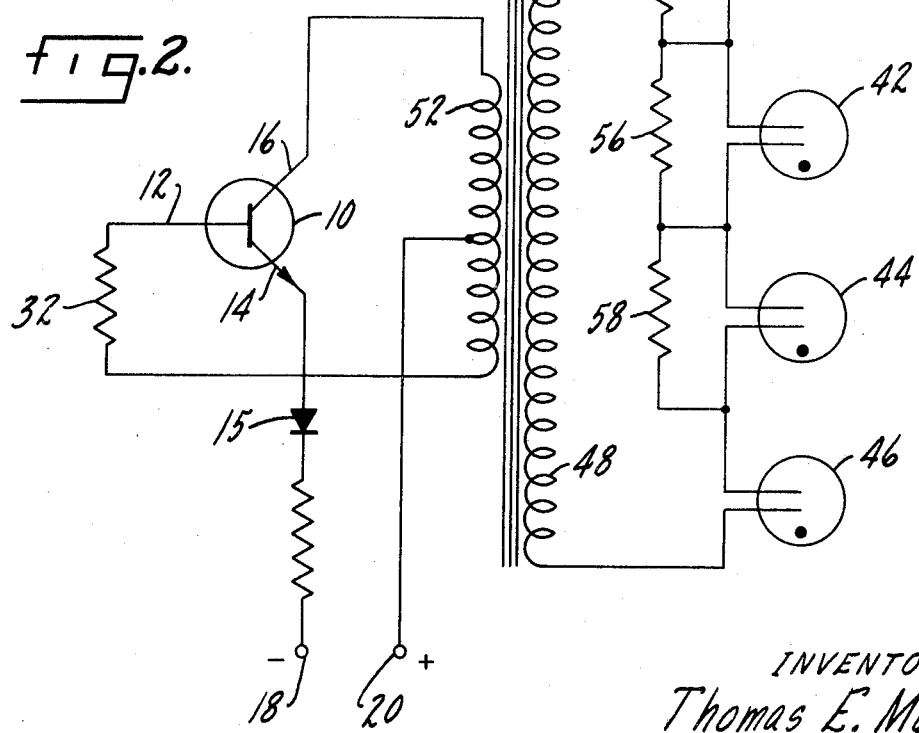
INVENTOR.
Thomas E. Myers,
BY Parker & Carter
Attorneys.

United States Patent Office 3,513,393
Patented May 19, 1970

---

3,513,393
VOLTAGE TESTER EMPLOYING AN OSCILLATOR POWERED BY THE TEST VOLTAGE
Thomas E. Myers, St. Charles, Ill., assignor to Ideal Industries, Inc., Sycamore, Ill., a corporation of Delaware
Continuation-in-part of application Ser. No. 393,158, Aug. 31, 1964. This application Mar. 26, 1968, Ser. No. 716,068
Int. Cl. G01r 19/14
U.S. Cl. 324—133      3 Claims

ABSTRACT OF THE DISCLOSURE

This invention relates to a DC voltage tester which can be utilized to determine which of two voltages are present and the polarity of the voltage terminals. The circuit includes a transistor oscillator which is operated by the voltage to be tested. The output of the oscillator circuit includes a coil with a pair of gas tubes connected across the coil. If one of the gas tubes is ignited, the lower of two voltages is present. If both gas tubes are ignited, the higher of the two voltages is present.

---

This application is a continuation-in-part of co-pending application Ser. No. 393,158, filed Aug. 31, 1964, now abandoned.

SUMMARY OF THE INVENTION

This invention relates to a voltage tester for use in testing DC voltages, and has for a primary purpose a voltage tester of the type described which utilizes a minimum of components and is extremely simple in design.

Another purpose of the invention is a voltage tester circuit of the type described which utilizes an oscillator to step up the voltage being tested to a sufficient level to operate one or more gas indicating tubes.

Another purpose is a testing circuit of the type described utilizing a simplified oscillator circuit having only a transistor, coil and resistor.

Another purpose is a testing circuit of the type described in which the voltage being tested is utilized to operate an oscillator circuit which steps up the voltage being tested to a point where it will operate one or more gas indicating bulbs.

Other purposes will appear in the ensuing specification, drawings and claims.

BRIEF DESCRIPTION OF THE DRAWINGS

The invention is illustrated in the following drawings wherein:

FIG. 1 is a circuit diagram illustrating one form of the invention, and

FIG. 2 is a similar circuit diagram illustrating a modification.

DESCRIPTION OF THE PREFERRED EMBODIMENT

In FIG. 1, a transistor is indicated at 10 and may include a base 12, an emitter 14 and a collector 16. The emitter 14 may be connected through a diode 15 to an input terminal 18 which, as shown herein, is the negative input terminal of a voltage tester and will conventionally be connected to a probe or the like. The other input terminal 20 which may be the positive terminal and which may be connected to a probe, is connected through a current limiting resistance 22 to the center tap, or intermediate tap, 24 of a coil or autotransformer 26. One terminal 28 of the transformer 26 is connected to the collector 16 and the other terminal 30 of the transformer is connected through a bias resistor 32 to the base 12 of the transistor.

A pair of gas indicating bulbs or tubes, for example Ne 2's, are indicated at 34 and 36. A resistance 38 is in parallel with bulb 36 and the parallel combination of resistor 38 and bulb 36 is in series with bulb 34. The entire combination of bulbs is in parallel or connected across transformer 26 which serves as the output element.

The circuit of FIG. 2 is substantially the same, except there are four indicating bulbs connected across the transformer. Like numbers have been given to like elements in FIGS. 1 and 2.

Indicating bulbs 40, 42, 44 and 46 are connected in series across secondary coil 48 of a transformer 50. The primary coil 52 of transformer 50 is connected in the circuit in the same manner as the autotransformer 26 in FIG. 1. Resistors 54, 56 and 58 are connected in parallel with indicating bulbs 40, 42 and 44, respectively.

The use, operation and function of the invention are as follows:

The voltage testing circuit shown in FIG. 1 can be utilized to quickly indicate whether or not the voltage being tested is either of one magnitude or another, for example either six volts or 12 volts DC. When a DC voltage is applied between input terminals 18 and 20, this voltage provides the operating voltage for an oscillator circuit which includes transistor 10, resistor 32 and transformer 26. No capacitance has been shown in this circuit, and it is not understood precisely what element in the circuit provides the capacitance effect. It is believed that the inherent capacity between the individual coils of transformer 26 provides the capacitance in the circuit, although it could be the inherent capacitance of the transistor 10. In any event, either the capacitance from the transistor or from the coil, or the combination of the two, does provide the capacitance necessary for the oscillator. The voltage supplied between terminals 18 and 20 cause the oscillator to develop a voltage across transformer 26 or between coil terminals 28 and 30. The voltage developed across the transformer is also applied to the series combination of the two gas indicating tubes 34 and 36. If the voltage applied to the input terminals is the lower of two voltages, for example six volts, then the voltage developed across the transformer will be sufficient to only ionize tube 34. However, if the voltage applied to the input terminals is the larger of the two voltages, for example 12 volts, then the voltage developed across the transformer will be sufficient to ionize both gas indicating bulbs. In this latter case, the voltage developed across resistance 38 will be high enough to cause bulb 36 to ionize.

The invention provides an extremely simple and inexpensive circuit for testing for one of two voltages. This may be a six and twelve volt voltage tester, or a 24 and 48 volt voltage tester, or any other combination of voltages may be tested.

The circuit of FIG. 2 operates in the same manner except that it can give an indication as to which of four voltages may be present. For example, the circuit may be used to test for six, twelve, 24 or 48 volts. The transformer 50 will perform essentially in the same manner as the autotransformer 26 of FIG. 1.

The oscillator circuit itself is important and has many uses other than as shown herein. As mentioned before, the capacity or the capacitor effect for the oscillator circuit comes from either the inherent capacity in the coil or from the inherent capacity in the transistor, or from both. It is not understood precisely where the capacitance effect comes from, but the circuit does work in the manner shown.

The invention should not be limited to any particular type of transistor, and the larger the current carrying capacity of the transistor, the larger the voltage that can be tested. Also, the type of gas indicating bulb should not be limited as many types of indicating bulbs or indicating devices have been shown to be satisfactory.

The invention should not be limited to the precise arrangement of circuit components shown. The transistor may be connected in the oscillator circuit in a variety of different ways. Also, other types of oscillator circuits may be satisfactory.

The diode 15 is shown between the emitter and terminal 18. It could also be positioned in the lead from terminal 20. The function of diode 15 is to prevent damage to the transistor in the event the polarity applied to the terminals is reversed.

I claim:

1. In a DC voltage testing circuit, a pair of input terminals for use in testing the magnitude and polarity of a voltage, an oscillator circuit including a transistor having a base, and emitter and collector terminals, a diode connected between one of the transistor terminals and one of said input terminals, a transformer connected to the other of said input terminals and to another transistor terminal, a connection between said transformer and said base, a plurality of gas tubes connected in series across said transformer, and a resistance in parallel with at least one of said gas tubes, the application of a DC voltage of the correct polarity to said input terminals causing said oscillator to operate and to develop a voltage across said transformer, the magnitude of the voltage at the input terminals determining the magnitude of the voltage across the transformer and which of the gas tubes is ionized.

2. The circuit of claim 1 further characterized by and including a resistor connected between said base and the transformer.

3. The circuit of claim 1 further characterized in that said transformer has two end terminals and a terminal intermediate the end terminals, the intermediate transformer terminal being connected to one of said input terminals, with the end terminals of said transformer being connected to the base and collector of said transistor.

References Cited

UNITED STATES PATENTS

| | | | |
|---|---|---|---|
| 2,707,760 | 5/1955 | Sherman | 340—248 XR |
| 3,026,505 | 3/1962 | Bevilacqua | 340—253 |
| 3,105,920 | 10/1963 | Dewey | 317—52 XR |
| 3,157,870 | 11/1964 | Marino et al. | 324—133 XR |
| 3,201,649 | 8/1965 | Ferri | 317—52 XR |
| 3,284,789 | 11/1966 | Fisher | 340—249 |

FOREIGN PATENTS 598,817  10/1959  Italy.

OTHER REFERENCES

Garvin, G. L.: Sun-Powered Oscillator, Radio-Electronics, March 1960, pp. 136, 137.

GERARD R. STRECKER, Primary Examiner

U.S. Cl. X.R.

324—29.5, 122; 340—252